United States Patent
Abdulrazzaq et al.

(10) Patent No.: US 11,435,271 B2
(45) Date of Patent: Sep. 6, 2022

(54) DETERMINING BOND STRENGTH OF MATERIALS USED IN WELLBORE OPERATIONS

(71) Applicant: Halliburton Energy Services, Inc., Houston, TX (US)

(72) Inventors: Waseem Abdulrazzaq, Al-Khobar (SA); Reem Alburaikan, Al-Khoba (SA)

(73) Assignee: Halliburton Energy Services, Inc., Houston, TX (US)

( * ) Notice: Subject to any disclaimer, the term of this patent is extended or adjusted under 35 U.S.C. 154(b) by 657 days.

(21) Appl. No.: 16/476,468

(22) PCT Filed: Aug. 8, 2018

(86) PCT No.: PCT/US2018/045791
§ 371 (c)(1),
(2) Date: Jul. 8, 2019

(87) PCT Pub. No.: WO2020/032941
PCT Pub. Date: Feb. 13, 2020

(65) Prior Publication Data
US 2021/0364400 A1    Nov. 25, 2021

(51) Int. Cl.
*G01N 3/08* (2006.01)
*G01N 3/10* (2006.01)

(52) U.S. Cl.
CPC .............. *G01N 3/08* (2013.01); *G01N 3/10* (2013.01); *G01N 2203/0019* (2013.01); *G01N 2203/0256* (2013.01)

(58) Field of Classification Search
CPC .... G01N 3/08; G01N 3/10; G01N 2203/0019; G01N 2203/0256
See application file for complete search history.

(56) References Cited

U.S. PATENT DOCUMENTS

| 7,350,576 B2 | 4/2008 | Robertson et al. |
| 7,621,186 B2 | 11/2009 | Heathman et al. |

(Continued)

FOREIGN PATENT DOCUMENTS

| CN | 105403505 | 3/2016 |
| CN | 105547999 | 5/2016 |

(Continued)

OTHER PUBLICATIONS

International Patent Application No. PCT/US2018/045791, International Search Report and Written Opinion dated May 3, 2019, 12 pages.

*Primary Examiner* — Jonathan M Dunlap
(74) *Attorney, Agent, or Firm* — Kilpatrick Townsend & Stockton LLP

(57) ABSTRACT

Described herein are methods and apparatus for testing bond strength of a chemical-sealant, lost circulation material to a subterranean sample. An apparatus can include a body defining walls of a chamber to receive a subterranean core sample from a wellbore, the body being sized to receive a chemical-sealant lost-circulation material (CS-LCM) to an area of the chamber between the core sample and the body, and a removable insert mateable to the body, the insert defining a base of the chamber, where the test apparatus is positionable to transfer a force to the core sample to decouple the core sample from the CS-LCM such that a shear bond strength of the CS-LCM to the core sample is determinable based on a maximum amount of force used to decouple the core sample from the CS-LCM.

20 Claims, 14 Drawing Sheets

(56) References Cited

U.S. PATENT DOCUMENTS

| | | |
|---|---|---|
| 8,601,882 B2 | 12/2013 | Gray et al. |
| 8,703,659 B2 | 4/2014 | Dalrymple et al. |
| 9,228,993 B2 | 1/2016 | Shine, Jr. et al. |
| 2014/0174192 A1 | 6/2014 | Shine, Jr. et al. |

FOREIGN PATENT DOCUMENTS

| | | |
|---|---|---|
| CN | 105973800 | 9/2016 |
| WO | 2004023111 | 3/2004 |

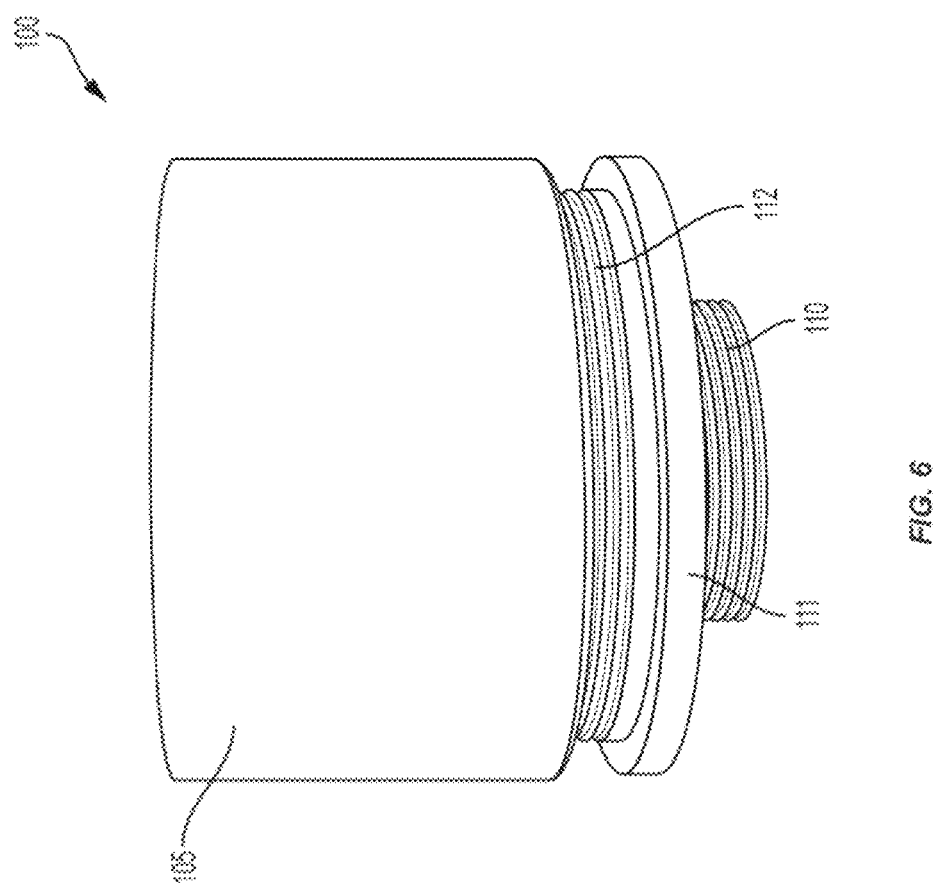

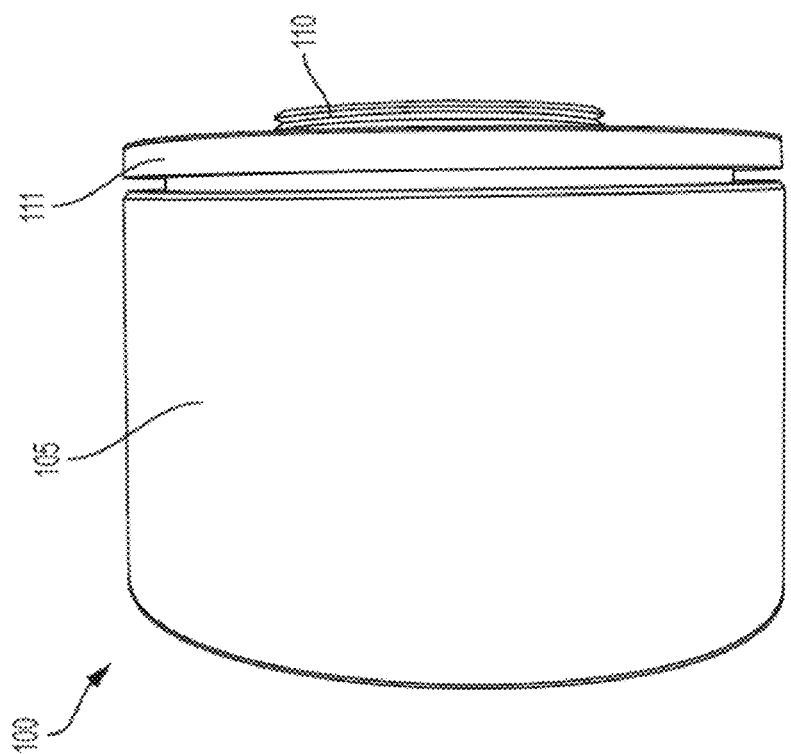

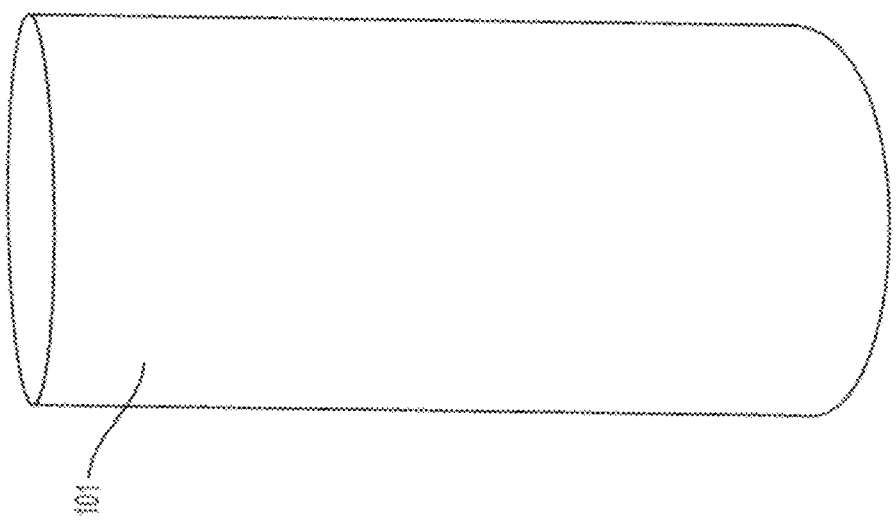

DETERMINING BOND STRENGTH OF MATERIALS USED IN WELLBORE OPERATIONS

FIELD

The present disclosure relates generally to testing bond strength of materials used in wellbore operations. More specifically, but not by way of limitation, this disclosure relates to determining the bond strength of lost-circulation materials that can be used as chemical sealants.

BACKGROUND

During drilling operations, a drilling fluid can be used to cool the drilling bit, control pressure within the wellbore, and suspend and transport drill cuttings from the wellbore to the surface. The drilling fluid can be circulated downwardly through the interior of a drill pipe and upwardly through the annulus, which is located between the exterior of the pipe and the wall of the subterranean formation. Once a casing is in place, a cement slurry may be positioned in the annulus to attach the casing to the walls of the wellbore and seal the annulus. During drilling and cementing, permeable zones in the subterranean formation may be encountered. The permeable zones may be, for example, vugs, voids, naturally occurring fractures, or induced fractures that occur when weak zones have fracture gradients exceeded by the hydrostatic pressure of the drilling fluid or the cement slurry. These permeable zones may result in the loss of the drilling fluid circulation in the wellbore during the drilling operation and can cause the drilling operation to be delayed. During the cementing operation, a portion of the cement slurry may also be lost to the permeable zones in the subterranean formation, which may not permit the cement slurry to fill the annulus completely, or the strength of the cement may be compromised by dehydration of the cement, causing additional delays.

Plugging materials can be used to seal the permeable zones in the subterranean formation and to prevent the loss of circulation of drilling fluids and cement slurries during the wellbore creation. The bond strength of the plugging materials with the subterranean formation can indicate whether the materials will successfully seal the permeable zones within the wellbore and prevent fluid loss. But the bond strength can depend on the geological makeup of the subterranean formation. Determining the bond strength of a particular material with respect to a particular subterranean formation can be difficult.

BRIEF DESCRIPTION OF THE DRAWINGS

FIG. 6 is a side view of an assembled testing apparatus with the seat and insert unscrewed according to one example of the present disclosure.

FIG. 7 is a side view of an assembled apparatus with the seat and insert installed according to one example of the present disclosure.

FIG. 8 is perspective view of a core sample prior to testing in a testing apparatus according to one example of the present disclosure.

DETAILED DESCRIPTION

Certain aspects and features of the present disclosure relate to determining a shear bond strength of a plugging material and a core sample. Plugging materials, such as a chemical-sealant, lost-circulation material (CS-LCM), can be used to bond to a subterranean formation, seal the permeable zones in a wellbore, and prevent the loss of circulation of drilling fluids and cement slurries through permeable zones within the formation. In some examples, a shear bond strength of a CS-LCM and a core sample may be determined using a test apparatus. A subterranean core sample from a wellbore, along with a CS-LCM can be inserted into the test apparatus. A force can be applied to the core sample, and a shear bond strength of the material to the core sample can be determined. The bond strength can be determined by a uniaxial load test, in which the applied force moves the core sample toward an end of the test apparatus.

The bond strength of the CS-LCM and the subterranean formation is a factor in the ability of the particular material to seal the permeable zones within a wellbore and prevent fluid loss. The selection of a CS-LCM may depend on the geological makeup of the subterranean formation. The shear bond strength between a CS-LCM and a core sample determined from the use of a test apparatus can be used in the selection of a plugging material. The shear bond strength can be correlated with, and may forecast, the bonding strength of the CS-LCM to a formation in a wellbore. Testing the bond strength external to the wellbore can aid in the selection of an optimal sealant material for use in a given wellbore, thereby reducing downtime for wellbore operations. By selecting a plugging material with high bond strength, the permeable zones within the wellbore can be effectively plugged, allowing wellbore operations to continue.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
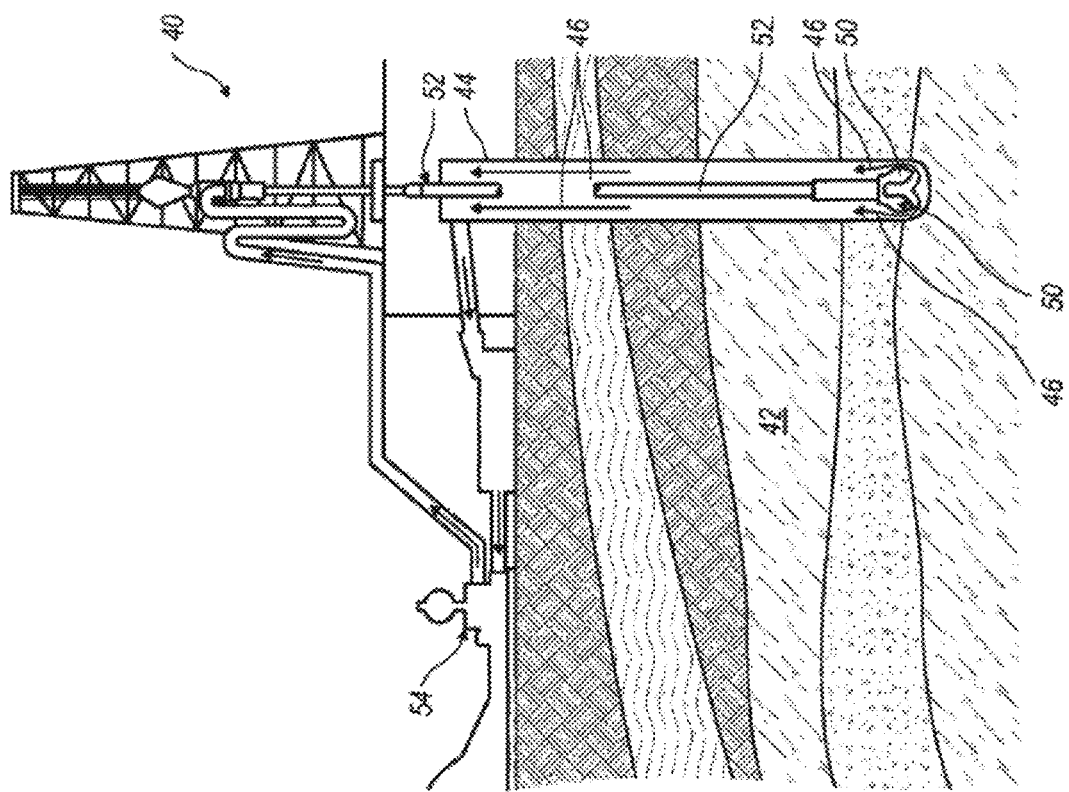
FIG. 1 is an illustrative schematic of the drilling of a wellbore through a subterranean formation during which a plugging material is employed to seal the formation to prevent the lost-circulation of the drilling fluid according to one example of the present disclosure.

FIG. 1 illustrates a wellbore 44 being drilled through a subterranean formation 42, during which a plugging material may be used to seal the subterranean formation 42. A drill rig 40 can be used for drilling the wellbore 44. A drill bit 50 may be mounted on the end of a drill string 52 that includes multiple sections of drill pipe. The wellbore 44 may be drilled by using a rotary drive at the surface to rotate the drill string 52 and to apply torque and force to cause the drill bit 50 to extend through wellbore 44. The drilling fluid may be displaced through the drill string 52 using one or more pumps 54. The drilling fluid may be circulated past the drill bit 50 and returned to the surface through the annulus of wellbore 44, as indicated by arrows 46, thereby removing drill cuttings (e.g., material such as rock generated by the drilling) from the wellbore 44. Although not shown, additional conduits besides drill string 52 may also be disposed within wellbore 44.

The subterranean formation 42 may contain permeable zones through which the drilling fluid may migrate from wellbore 44 into the subterranean formation 42. These permeable zones may be, for example, fractures, fissures, streaks, voids, vugs, and the like. The presence of such permeable zones in the subterranean formation 42 may cause the circulation of the drilling fluid in wellbore 44 to be lost such that the fluid does not flow back to the surface of the earth. To maintain good circulation of the drilling fluid in wellbore 44, a plugging material may be passed into wellbore 44 and allow to set downhole. The strength of the plugging material may increase with time after placement downhole.

In some examples, plugging material for use in sealing a subterranean formation can include for example, hydraulic cements, diesel oil bentonite mud mixes (DOB), diesel oil bentonite mud mixes with cement added to increase strength (DOBC), sorrel cement mixed in viscosified oil (clay and viscosifier), resins, and thixotropic slurries. The plugging materials can include a chemical-sealant, lost-circulation material (CS-LCM).

While co-mingling or meeting with the favorable downhole conditions, the free flowing plugging material can set irreversibly hard into permeable zones. The favorable conditions can include, for example, pH, salinity, water, temperature, and shear rate. And, the plugging material may rapidly develop compressive strength. The plugging material can quickly set into a rigid sealing mass that is substantially impermeable to fluid (i.e., no fluid or only a small amount of fluid can pass through the mass). After setting, the plugging material may not be able to be washed out of the permeable zones, and the circulation of the drilling fluid through wellbore 44 may be resumed without concern that the drilling fluid may escape from wellbore into the subterranean formation.

After drilling the wellbore 44 is completed, drill string 52 and drill bit 50 may be removed from wellbore 44. And a casing can be positioned in wellbore 44. Primary cementing may then be performed by pumping a cement slurry down the casing and into the annulus between the casing and the wall of wellbore 44. The set-plugging material can block the permeable zones and prevent the cement slurry from flowing into the subterranean formation. As a result, the hydrostatic pressure of the cement slurry may be maintained such that the slurry returns to the surface and forms a relatively strong cement column in the annulus of the wellbore.

One factor in selecting a plugging material in a wellbore application is the ability of a plugging material to bond to a formation and sufficiently plug the permeable zones within the formation. The bond strength of the material and the formation can be used to predict the feasibility of using a particular plugging material. Conditions in the wellbore can emulated to determine a bond strength of a material and a formation. In some cases, a core sample from a geologic formation may have permeable zones that require plugging to continue wellbore operations. Bond strengths for various plugging materials may be determined and aid in the selection of a plugging material that can form a strong bond with a specific formation. In some cases, bond strength data for chemical-sealant, lost-circulation materials (CS-LCMs) and representative core samples from a geologic formation may be determined.

In some examples, the conditions within the wellbore can be emulated to facilitate the selection of a suitable plugging material. For example, the test apparatus may be heated to substantially cure the CS-LCM. In some cases, a core sample from a specific wellbore formation may be used in the apparatus to determine the bond strength of a potential CS-LCM to the formation. The bond strength determination can forecast the ability of the selected plugging material to block permeable zones within the wellbore. The bond strength can also forecast the ability of the selected plugging material to withstand hydrostatic pressures within the wellbore. In some examples, a CS-LCM may be placed in contact with a core sample and the bond strength of the CS-LCM and the core sample tested under compressive force.

In some examples, a test apparatus may include a body that defines walls of a chamber to receive a subterranean core sample from a wellbore. The body can be sized to receive a chemical-sealant, lost-circulation material (CS-LCM) to an area of the chamber between the core sample and the body. The apparatus may include a removable insert that can be mated to the body, where the insert defines a base of the chamber. The test apparatus can be positioned in a test instrument to determine the strength of the bond between the core sample and CS-LCM. The instrument may apply a force to the core sample to decouple the core sample from the CS-LCM. Once the force applied exceeds the bond strength, the core sample may decouple from the CS-LCM and the core sample may travel in the apparatus in the direction of the applied force. The shear bond strength of the CS-LCM to the core sample can be determined based on a maximum amount of force used to decouple the core sample from the CS-LCM.

Figure 2:
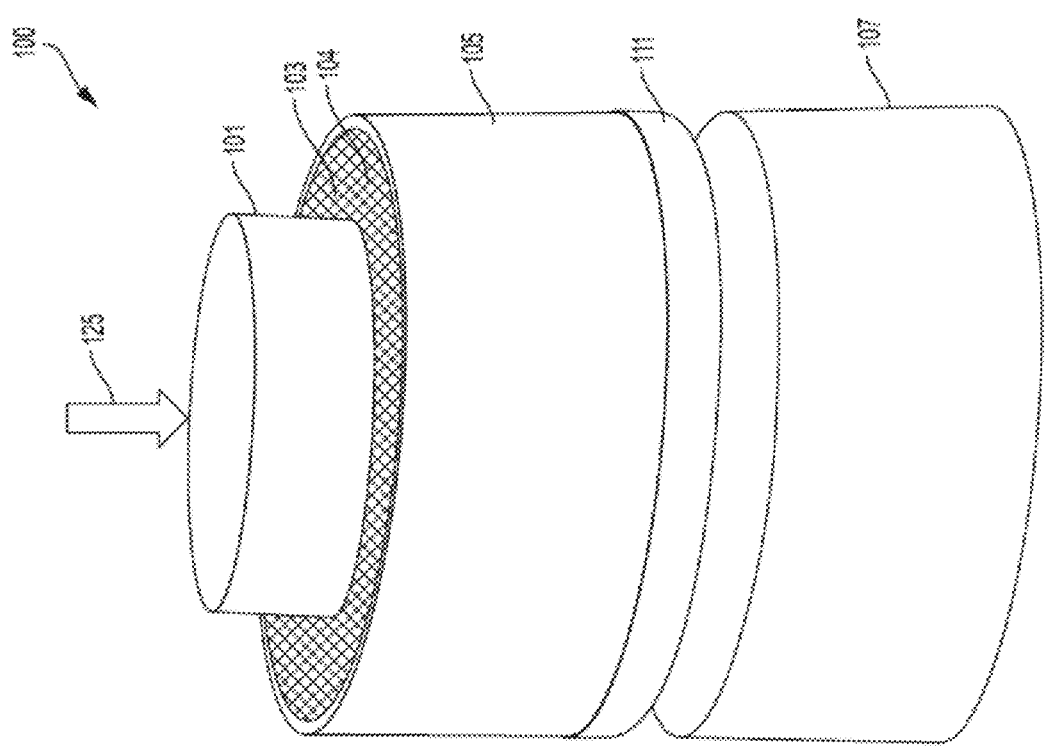
FIG. 2 is a schematic of an assembled testing apparatus for testing plugging materials according to one example of the present disclosure.

An assembled testing apparatus 100 according to some examples is shown in FIG. 2. The apparatus includes a body 105, an insert 111 and a support cell 107. A core sample 101 is located substantially in the center of a chamber 103, defined by a body 105 of a test apparatus. A CS-LCM 104 can be added to an area of the chamber 103 between the core sample 101 and the body 105 such that the CS-LCM 104 and the core sample 101 can at least partially bond together. A compressive force 125 can be applied to the core sample 101 to decouple the core sample 101 from the CS-LCM 104.

Figure 3:
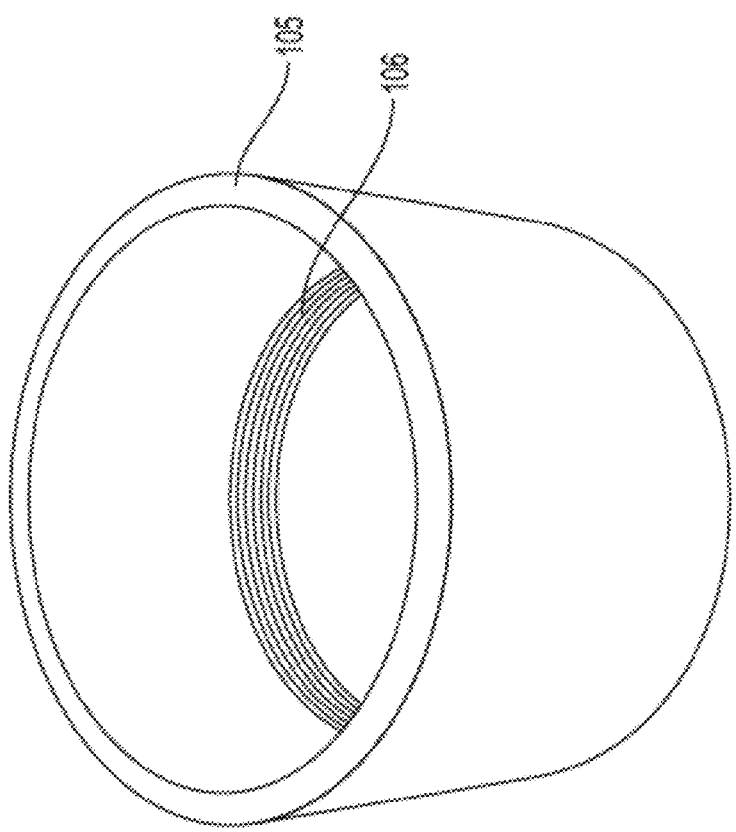
FIG. 3 is a perspective view of a body of the testing apparatus according to one example of the present disclosure.

FIG. 3 shows a perspective view of a body 105 of the testing apparatus 100 according to one example. The one-piece body 105 has female grooves 106 on an interior surface of a distal end of the body 105. In some examples, the body 105 has sidewall approximately two inches in height. In FIG. 3, the body 105 is a ring, but other geometries can be used.

Figure 4:
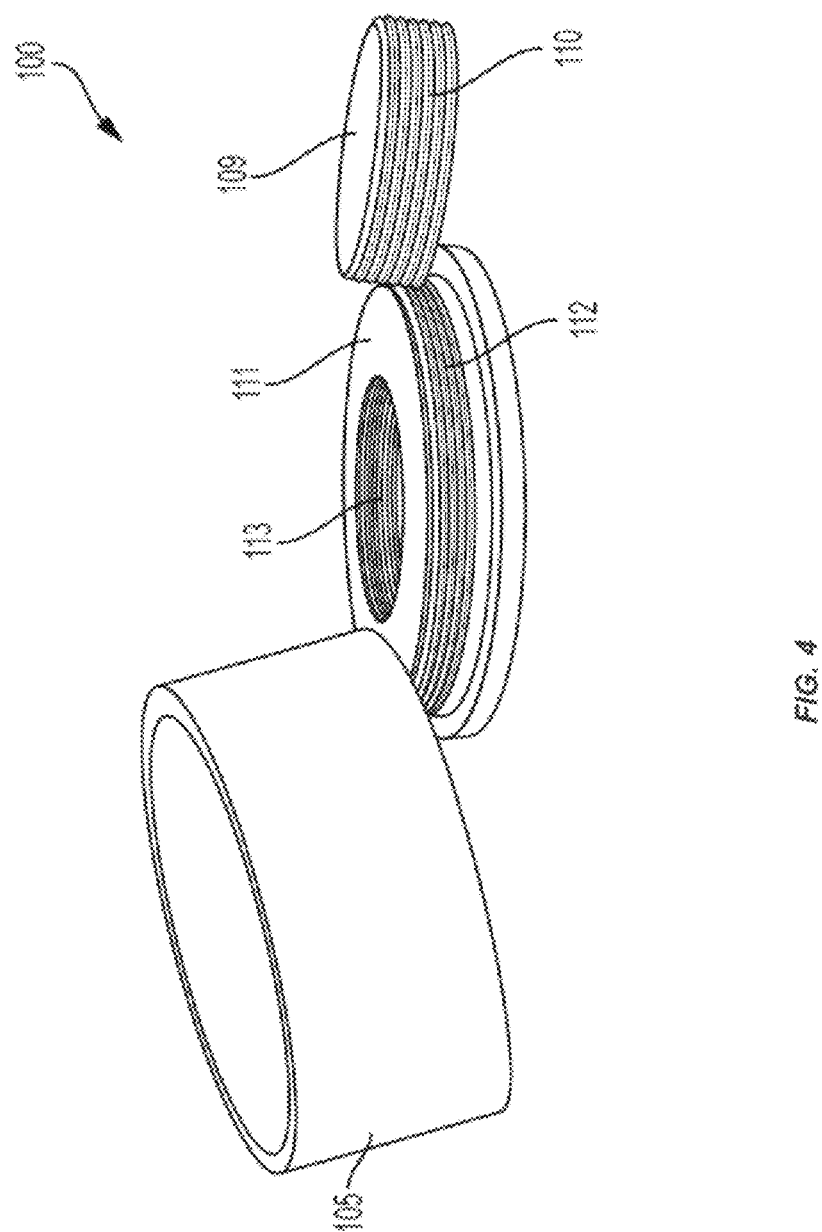
FIG. 4 is a side view of a body, insert, and seat of a testing apparatus according to one example of the present disclosure.

FIG. 4 shows a side view of a body 105, insert 111, and seat 109 of a testing apparatus 100 according to one example. The insert 111 has male grooves 112 on an exterior surface of a proximal end of the insert 111, where the male grooves 112 of the insert 111 are mateable to the female grooves 106 (shown in FIG. 3) of the body 105. The insert 111 further includes a passageway defined by the thickness of the insert 111. In some cases, the insert 111 can include female grooves 113 on a surface defining a portion of the passageway. The passageway may be sized to allow the core sample 101 to move at into at least a portion of the passageway when a compressive force is applied to the core sample 101. The apparatus can include a seat 109 having male grooves 110 on a side wall, the grooves 110 of the seat 109 being mateable with the female grooves 113 of the passageway of the insert 111. Mating of the apparatus components is made with grooves or threads in some cases. In other cases, the components can be mated using pins and notches or other connection means known to one of skill in the art. The testing apparatus 100, including the body 105, insert 111, and seat 109, may be substantially circular in shape; however, other geometries may be used.

Figure 5:
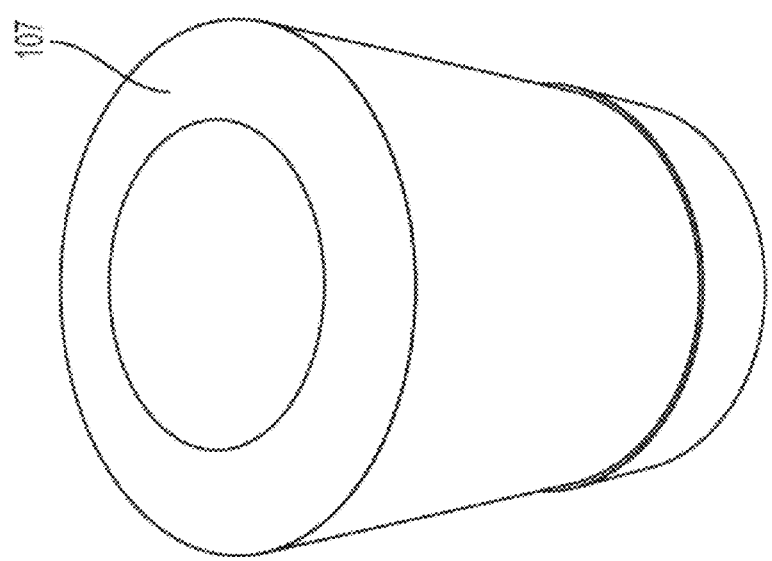
FIG. 5 is a perspective view of a support cell of the testing apparatus according to one example of the present disclosure.

FIG. 5 is a perspective view of a support cell 107 of the testing apparatus 100 according to one example. The support cell 107 includes a passageway having a diameter greater than the diameter of a core sample 101. During testing, the assembled body 105 and insert 111 can rest upon the support cell 107. The top surface of the support cell 107 may be substantially planar to hold the mated body 105 and insert 111 in a stacked configuration. The size of the passageway of the support cell 107 allows for the core sample 101 to move toward the support cell 107 when the compressive force 125 is applied to the core sample 101. In some cases, the core sample 101 may partially enter the passageway of the support cell 107.

FIG. 6 is a side view of an assembled testing apparatus 100 according to one example with the seat 109 and insert 111 unscrewed. FIG. 7 is a side view according to one example of the assembled testing apparatus 100 with the seat 109 and insert 111.

FIG. 8 is perspective view of a core sample 101 from a wellbore prior to testing in a testing apparatus according to one example of the present disclosure. A core sample 101 can be cylindrical in shape; however, other geometries can be used. A cylindrical shape can allow for substantially uniform shear stress to be exerted about the core sample 101. In some examples, the height of the core sample 101 can be larger than the height of the body 105. For example, the core sample can be approximately three inches in height for use in a body of two inches in height.

Figure 9B:
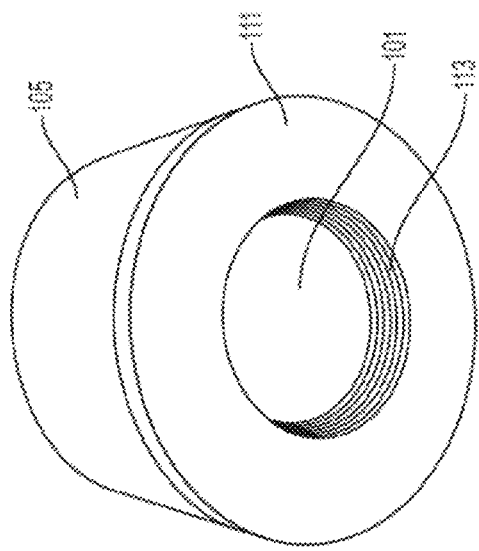
FIG. 9B is a bottom view of the test sample of FIG. 9A according to one example of the present disclosure.
Figure 9A:
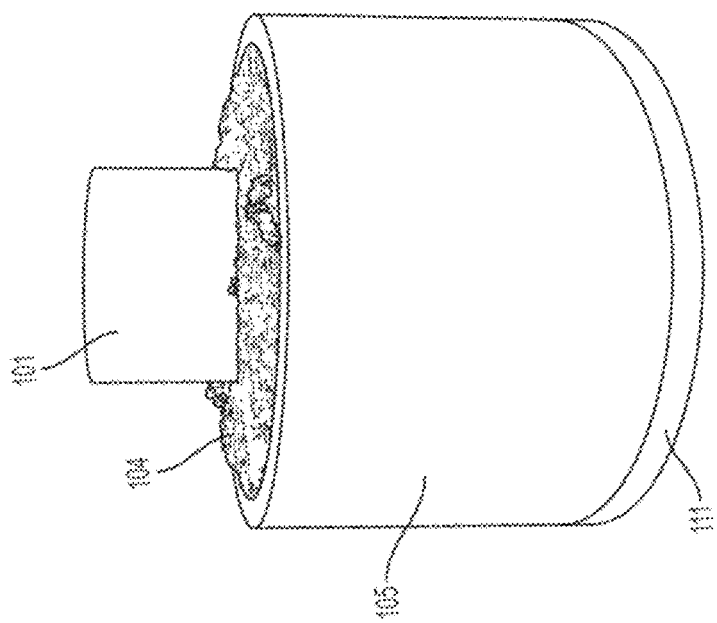
FIG. 9A is a perspective view of a test sample prior to uniaxial load testing according to one example of the present disclosure.

FIGS. 9A and 9B show a test sample prior to uniaxial load testing according to one example described herein. FIG. 9A is a perspective view, while FIG. 9B is a bottom view. The core sample 101 is placed in the assembled testing apparatus 100 such that the core sample 101 is substantially centered within a chamber 103 defined by the body 105 of the test apparatus. The core sample 101 rests upon the seat 109 at the distal end of the testing apparatus 100 while the CS-LCM 104 is added to an area of the chamber 103 between the core sample 101 and the body 105. In some cases, the seat 109 can position a depth of the core sample 101 within the testing apparatus 100. In a prepared sample, the plugging material, CS-LCM 104, substantially fills the area of the chamber 103 between the body 105 and the core sample 101 and contacts the core sample 101. As shown in FIG. 9B, the seat 109 can be removed from the insert 111 once the CS-LCM 104 has cured and is at least partially bonded together with the core sample 101. In some examples, the testing apparatus 100 may be heated to substantially cure the CS-LCM 104. Once the seat 109 is removed, the end of the core sample 101 is located above the female grooves 113 of the insert 111.

Figure 10B:
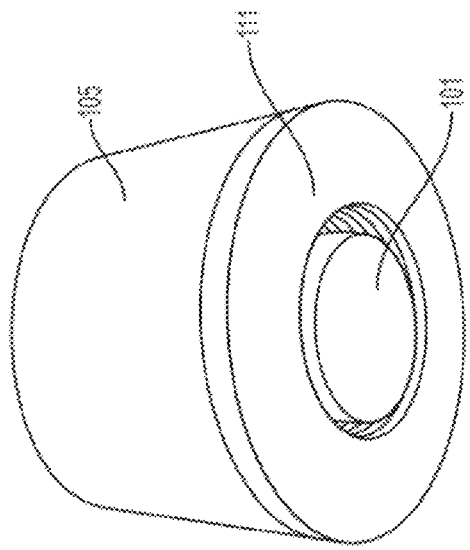
FIG. 10B is a bottom view of the test sample of FIG. 10B subsequent to uniaxial load testing according to one example of the present disclosure.
Figure 10A:
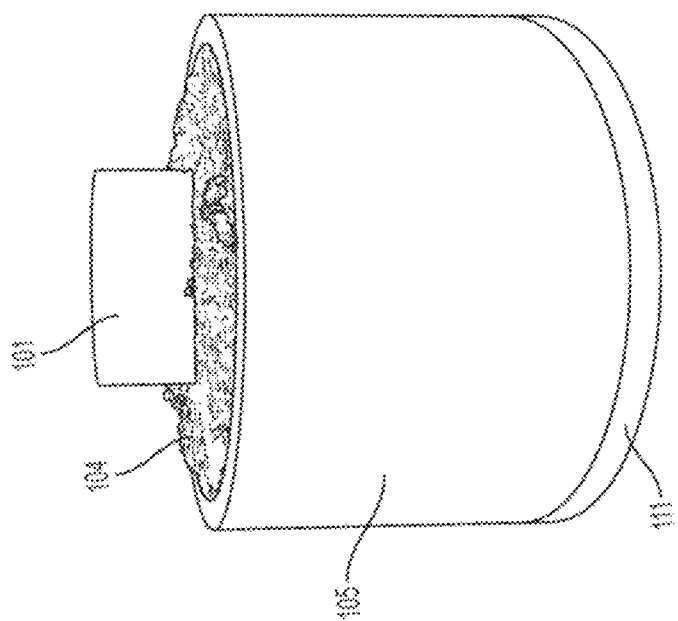
FIG. 10A is a perspective view of a test sample subsequent to uniaxial load testing according to one example of the present disclosure.

FIGS. 10A and 10B show a test sample subsequent to uniaxial load testing according to one example of the present disclosure. FIG. 10A is a perspective view and FIG. 10B is a bottom view. During a bond strength test using a uniaxial compression instrument, a compressive force 125 is placed on the core sample 101. Once the compressive force 125 exceeds the bond strength of the CS-LCM 104 to the core sample 101, the core sample 101 will decouple from the CS-LCM 104 and the core sample 101 will move toward the distal end of the testing apparatus 100, through the passageway of the insert 111. The core sample 101 may move to the distal end of the body 105, covering the female grooves 113 of the insert 111 once the core sample 101 decouples from the CS-LCM 104 due to the compressive force 125 applied. In some cases, the core sample 101 may be pushed downward into a portion of the support cell 107 beneath the testing apparatus 100. The test apparatus 100 can be decoupled to aid in removing the CS-LCM 104 and core sample 101 once the test has been completed. The insert 111 may decouple from the body 105, which provides full access to the body 105 to remove the CS-LCM 104.

The resulting bond strength can be determined from the maximum compressive force or load applied to the core sample and the area of the bond, which is the interface between the core sample and CS-LCM. The CS-LCM fills a chamber around the core sample. For cylindrical samples, the area of the bond can be calculated from interface of the CS-LCM and the core sample using the height of the chamber and the circumference of the core sample according to Equation 1:

$$\text{Bond area} = d \cdot h \cdot \pi \quad \text{(Eq. 1)}$$

where d is the diameter of the core sample and h is the height of the CS-LCM in the chamber in contact with the core sample. The bond strength is then calculated according to Equation 2.

$$\text{Bond Strength} = (\text{Maximum Load/Bond area}) \quad \text{(Eq. 2)}$$

The bond strength measured relates directly to the strength of the interface of the CS-LCM with the core sample. The design of the apparatus with a simple one-piece body, removable insert, and seat that aligns the core sample until the CS-LCM has substantially cured can help ensure reproducibility and reduce testing error.

In some examples, a system for determining bond strength of a plugging material and a core sample may include an instrument that can apply a force to a subterranean core sample from a wellbore. The core sample may be positioned within a test apparatus and placed in contact with a CS-LCM. In some cases, the instrument can be controlled by a computer and can include extensometers configured to measure the compressive strain of the core sample during testing. The shear bond strength of the material to the core sample can be determined from the maximum forced applied and the size of the core sample. In some cases, the system may further include a heating unit configured to substantially cure the material in the test apparatus.

Example

Three samples were prepared according to a method described herein. A body, insert, and seat were assembled to prepare the apparatus for testing. A pocket was created for the core sample to sit in by exposing an outer portion of the threads of the seat. A core sample approximately three inches in height and 1.5 inches in diameter was obtained to simulate the wellbore. The core sample was placed in the apparatus, with a portion of the core sample resting in the pocket of the seat, which helped to align the core sample in the center of the apparatus. A chemical-sealant, lost-circulation material (CS-LCM) was added to the chamber of the apparatus and heated according to manufacturer's specification to substantially cure the CS-LCM. Once the CS-LCM had substantially cured, the seat was removed from the apparatus, exposing the end of the core sample through the passageway of the insert.

Figure 11:
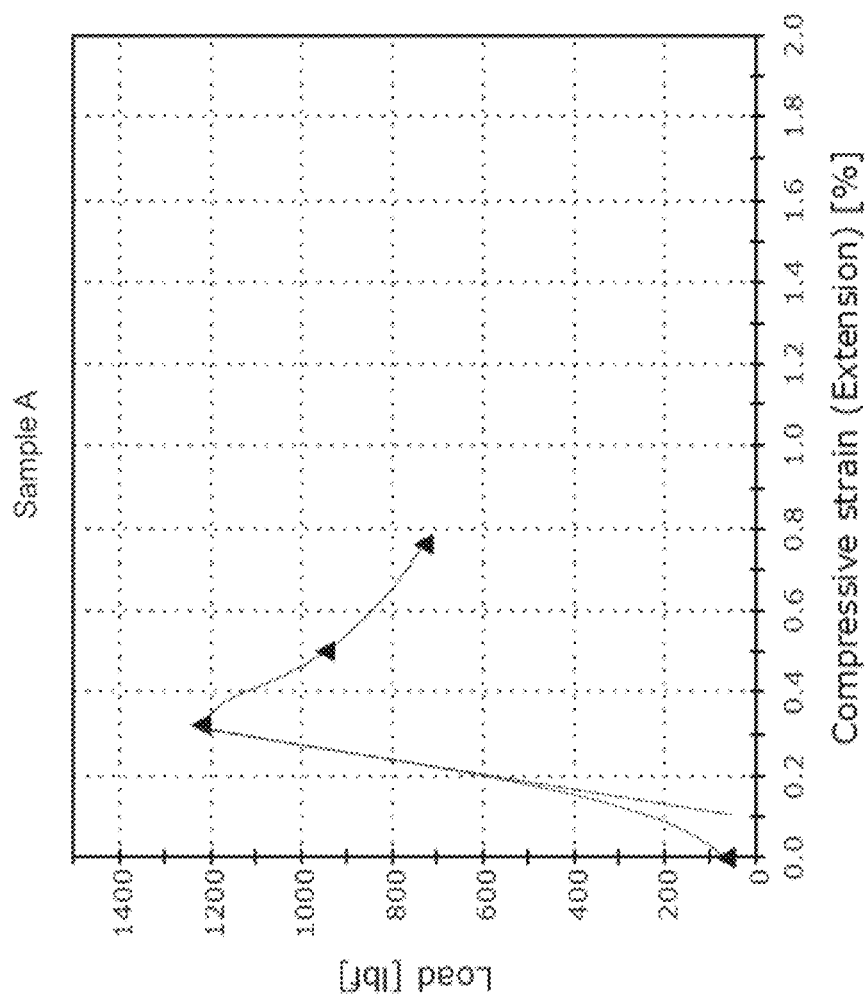
FIG. 11 is a chart of compressive strain with respect to load of core sample A, obtained from load testing according to one example of the present disclosure.
Figure 12:
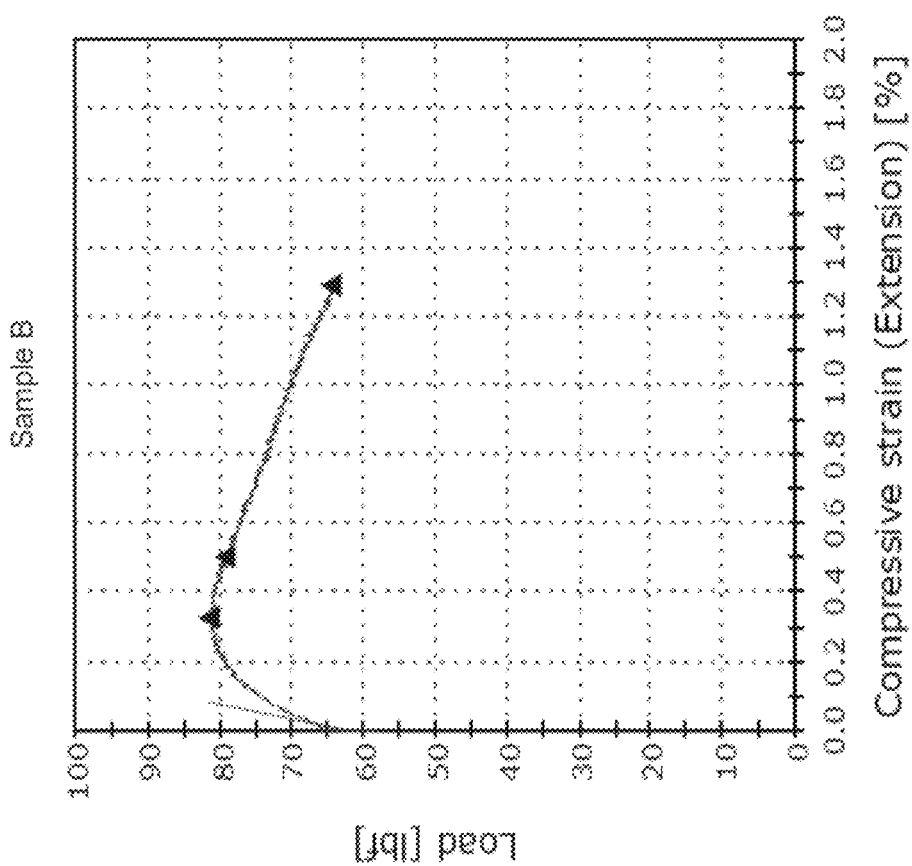
FIG. 12 is a chart of compressive strain with respect to load of core sample B, obtained from load testing according to one example of the present disclosure.
Figure 13:
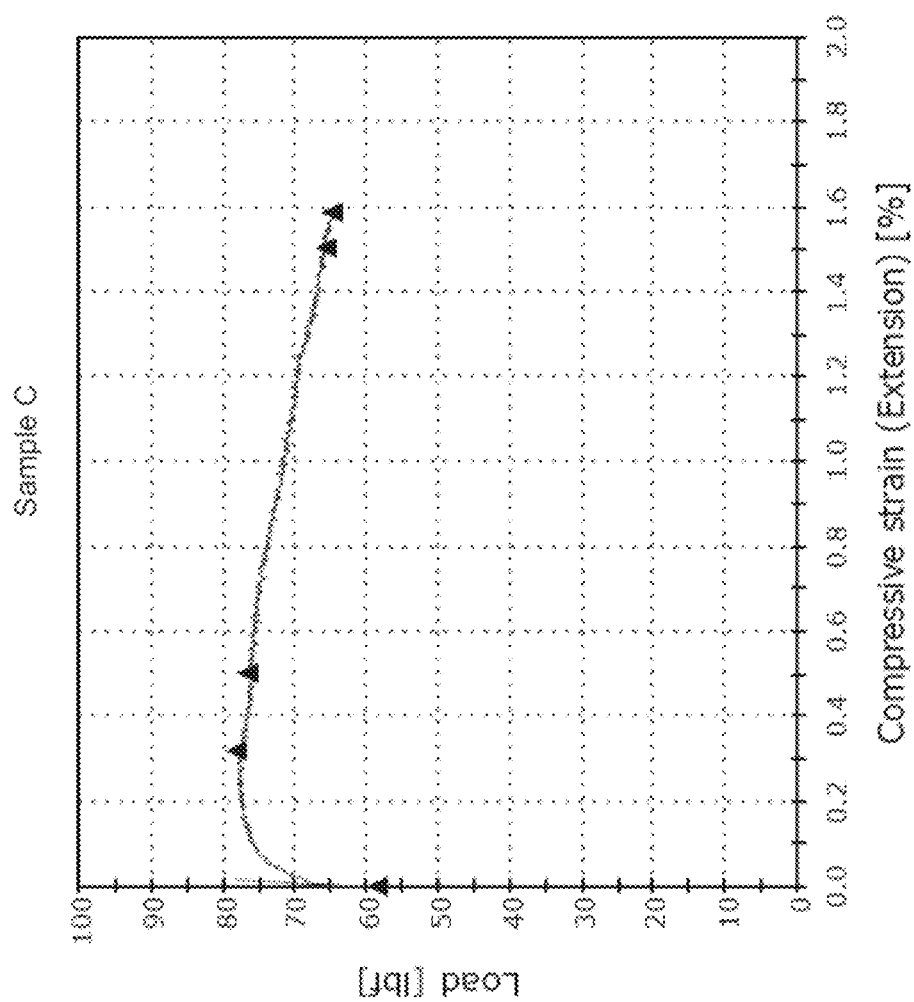
FIG. 13 is a chart of compressive strain with respect to load of core sample C, obtained from load testing according to one example of the present disclosure.

The test sample was placed upon a support cell on a lower plate of a uniaxial compression instrument. A top plate of the instrument was set touching the end of the core sample. The compression test was initiated and the top plate moved downward toward the stationary bottom place until the force exceeded the bond strength of the sample, the CS-LCM decoupled from the core sample, and the core sample moved to a lower portion of the apparatus, extending into the support cell. The testing method was repeated for the remaining samples. The maximum force applied by the instrument was recorded for each sample tested. FIGS. 11, 12, and 13 show the load-strain plots for Samples A, B, and C respectively. Sample A exhibited a much higher maximum load than Samples B and C.

The conditions for sample preparation and testing and resulting bond strength results are provided in Table 1.

TABLE 1

| Test Information | Sample A | Sample B | Sample C |
| --- | --- | --- | --- |
| CS-LCM Density, ppg | 9.5 | 9.5 | 10.5 |
| CS-LCM Activator | 77pcf WBM | 77pcf WBM | shear dependent |
| CS-LCM Curing Condition | Wet | Wet | Wet |
| CS-LCM Curing Temp, ° F. | 190 | 190 | 175 |
| CS-LCM Curing Time, hrs | 2 | 2 | 24 |
| Load rate, inch/s | 0.1001 | 0.0001 | 0.0001 |
| Core used | Brea sandstone | Brea sandstone | Brea sandstone |
| Core Diameter, inch | 1.5 | 1.5 | 1.5 |
| CS-LCM height, inch | 2 | 2 | 2 |
| Bond Strength, psi | 130 | 8.75 | 8.4 |

Figure 14:
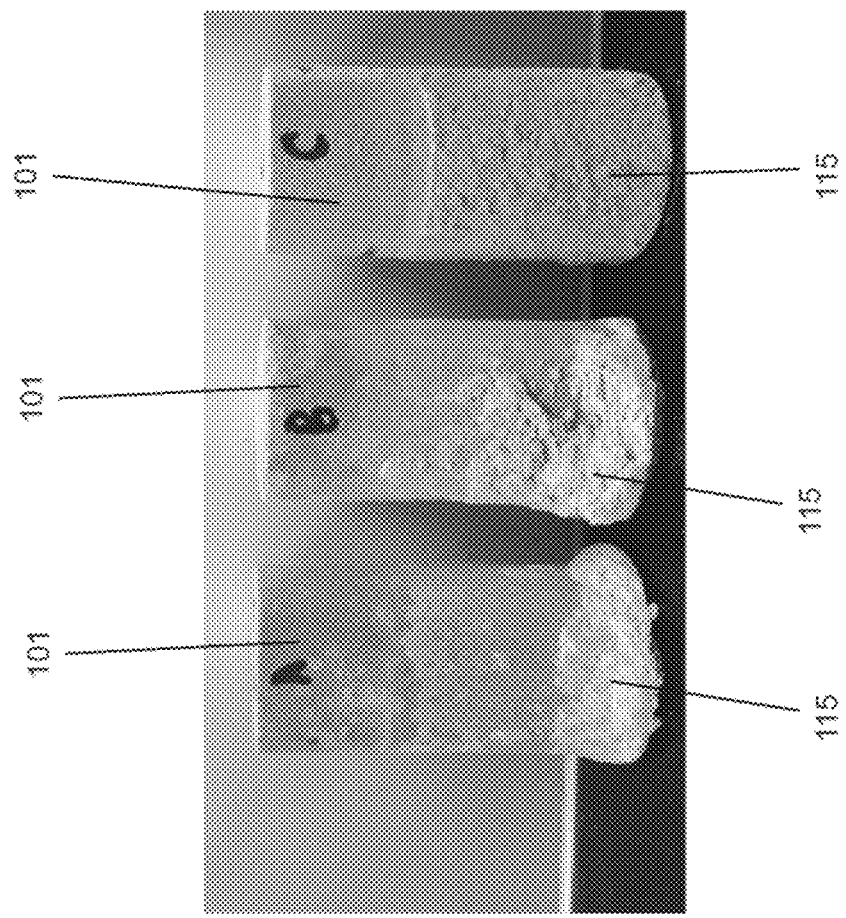
FIG. 14 is a perspective view of test samples A, B, and C subsequent to load testing according to one example of the present disclosure.

A visual inspection of the core samples was also made after testing. FIG. 14 shows three core samples 101 after uniaxial compression testing. Each of the samples (A. B. and C) had residual CS-LCM 115 attached to the core sample 101. However, Samples B and C had more CS-LCM remaining along the length of the core sample, which may correlate to the lower bond strength result.

Illustrative Embodiments of Suitable Fluids and Methods

As used below, any reference to methods, products, or systems is understood as a reference to each of those methods, products, or systems disjunctively (e.g., "Illustrative embodiment 1-4 is understood as illustrative embodiment 1, 2, 3, or 4.").

Illustrative embodiment 1 is a test apparatus comprising a body defining walls of a chamber to receive a subterranean core sample from a wellbore, the body being sized to receive a chemical-sealant lost-circulation material (CS-LCM) to an area of the chamber between the core sample and the body and a removable insert mateable to the body, the insert defining a base of the chamber, wherein the test apparatus is positionable to transfer a force to the core sample to decouple the core sample from the CS-LCM such that a shear bond strength of the CS-LCM to the core sample is determinable based on a maximum amount of force used to decouple the core sample from the CS-LCM.

Illustrative embodiment 2 is the apparatus of any preceding or subsequent illustrative embodiment, wherein the body comprises grooves at an interior surface of a distal end of the body and the insert comprises grooves on an exterior surface of a proximal end of the insert, the grooves of the insert being mateable to the grooves of the body.

Illustrative embodiment 3 is the apparatus of any preceding or subsequent illustrative embodiment, wherein the insert further comprises a passageway defined by a thickness of the insert, the passageway being sized to allow the core sample to move into at least a portion of the passageway when the force is applied to the core sample.

Illustrative embodiment 4 is the apparatus of any preceding or subsequent illustrative embodiment, further comprising a seat mateable to the insert, the seat positioning a depth of the core sample within the body.

Illustrative embodiment 5 is the apparatus of any preceding or subsequent illustrative embodiment, wherein the thickness of the insert defining the passageway comprises grooves and the seat comprises grooves on a sidewall.

Illustrative embodiment 6 is the apparatus of any preceding or subsequent illustrative embodiment, wherein the seat is substantially the same size as the passageway of the insert.

Illustrative embodiment 7 is the apparatus of any preceding or subsequent illustrative embodiment, further comprising support cell having a planar surface to hold the mated body and insert and a passageway defined by a thickness of the support cell, the passageway being sized to allow the core sample to move into a portion of the passageway when the force is applied to the core sample.

Illustrative embodiment 8 is the apparatus of any preceding or subsequent illustrative embodiment, wherein the core sample is substantially cylindrical in shape allowing for substantially uniform shear stress to be exerted about the core sample.

Illustrative embodiment 9 is a method comprising adding a subterranean core sample from a wellbore to a chamber defined by a body of a test apparatus, adding a chemical-sealant, lost-circulation material (CS-LCM) to a volume of the chamber between the core sample and the body such that the CS-LCM and the core sample contact one another and at least partially bond together, applying a force to the core sample to decouple the core sample from the CS-LCM, and determining a shear bond strength of the CS-LCM to the core sample based on a maximum amount of the force used to decouple the core sample from the CS-LCM.

Illustrative embodiment 10 is the method of any preceding or subsequent illustrative embodiment, wherein applying the force to the core sample includes causing the core sample to move toward a distal end of the test apparatus.

Illustrative embodiment 11 is the method of any preceding or subsequent illustrative embodiment, further comprising heating the test apparatus to substantially cure the CS-LCM prior to applying the force to the core sample.

Illustrative embodiment 12 is the method of any preceding or subsequent illustrative embodiment, further comprising placing the core sample upon a removable seat to align the core sample within the body of the test apparatus and removing the seat prior to applying force to the core sample.

Illustrative embodiment 13 is the method of any preceding or subsequent illustrative embodiment, wherein the core sample is substantially cylindrical in shape.

Illustrative embodiment 14 is the method of any preceding or subsequent illustrative embodiment, wherein the CS-LCM substantially fills the volume of the chamber between the core sample and the body.

Illustrative embodiment 15 is the method of any preceding or subsequent illustrative embodiment, further comprising placing the test apparatus on a support cell comprising a passageway prior to applying the force to the core sample, the passageway being defined by a thickness of the support cell.

Illustrative embodiment 16 is the method of any preceding or subsequent illustrative embodiment, wherein a diameter of the support cell passageway is larger than the diameter of the core sample.

Illustrative embodiment 17 is a system comprising an instrument to apply a force to a subterranean core sample from a wellbore and that is positioned within a test apparatus and in contact with a chemical-sealant, lost-circulation material (CS-LCM), to determine a shear bond strength of the CS-LCM to the core sample.

Illustrative embodiment 18 is the system of any preceding or subsequent illustrative embodiment, wherein the instrument is controllable by a computer.

Illustrative embodiment 19 is the system of any preceding or subsequent illustrative embodiment, further comprising a heating unit to substantially cure the CS-LCM in the test apparatus prior to the instrument applying the force to the subterranean core sample.

Illustrative embodiment 20 is the system of any preceding or subsequent illustrative embodiment, wherein the test apparatus comprises a body defining walls of a chamber to receive a subterranean core sample from a wellbore, the body being sized to receive a chemical-sealant lost-circulation material (CS-LCM) to an area of the chamber between the core sample and the body, and a removable insert mateable to the body, the insert defining a base of the chamber.

Definitions and Descriptions

The terms "disclosure," "the disclosure," "the present disclosure," "embodiment," "certain embodiment" and the like are used herein are intended to refer broadly to all the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted. It is further noted that, as used in this specification, the singular forms "a," "an," and "the" include plural referents unless expressly and unequivocally limited to one referent.

Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

Various embodiments of the present disclosure have been described herein. It should be recognized that these embodiments are merely illustrative of the present disclosure. Variations of those preferred embodiments may become apparent to those of ordinary skill in the art upon reading the foregoing description. The inventors expect skilled artisans to employ such variations as appropriate, and the inventors intend for the present disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated or otherwise clearly contradicted by context.

It is to be understood that the present description illustrates aspects of the disclosure relevant to a clear understanding of the present disclosure. Certain aspects of the disclosure that would be apparent to those of ordinary skill in the art and that, therefore, would not facilitate a better understanding of the disclosure have not been presented in order to simplify the present description. Although the present disclosure has been described in connection with certain embodiments, the present disclosure is not limited to the particular embodiments disclosed, but is intended to cover modifications that are within the spirit and scope of the disclosure.

What is claimed is:

1. A test apparatus comprising:
   a body defining walls of a chamber to receive a subterranean core sample from a wellbore, the body being sized to receive a chemical-sealant lost-circulation material (CS-LCM) to an area of the chamber between the core sample and the body; and
   a removable insert mateable to the body, the insert defining a base of the chamber,
   wherein the test apparatus is positionable to transfer a force to the core sample to decouple the core sample from the CS-LCM such that a shear bond strength of the CS-LCM to the core sample is determinable based on a maximum amount of force used to decouple the core sample from the CS-LCM.

2. The test apparatus of claim 1, wherein the body comprises grooves at an interior surface of a distal end of the body and the insert comprises grooves on an exterior surface of a proximal end of the insert, the grooves of the insert being mateable to the grooves of the body.

3. The test apparatus of claim 1, wherein the insert further comprises a passageway defined by a thickness of the insert, the passageway being sized to allow the core sample to move into at least a portion of the passageway when the force is applied to the core sample.

4. The test apparatus of claim 3, further comprising a seat mateable to the insert, the seat positioning a depth of the core sample within the body.

5. The test apparatus of claim 4, wherein the thickness of the insert defining the passageway comprises grooves and the seat comprises grooves on a sidewall.

6. The test apparatus of claim 4, wherein the seat is substantially the same size as the passageway of the insert.

7. The test apparatus of claim 1, further comprising support cell having a planar surface to hold the mated body and insert and a passageway defined by a thickness of the support cell, the passageway being sized to allow the core sample to move into a portion of the passageway when the force is applied to the core sample.

8. The test apparatus of claim 1, wherein the core sample is substantially cylindrical in shape allowing for substantially uniform shear stress to be exerted about the core sample.

9. A method comprising:
adding a subterranean core sample from a wellbore to a chamber defined by a body of a test apparatus;
adding a chemical-sealant, lost-circulation material (CS-LCM) to a volume of the chamber between the core sample and the body such that the CS-LCM and the core sample contact one another and at least partially bond together;
applying a force to the core sample to decouple the core sample from the CS-LCM; and
determining a shear bond strength of the CS-LCM to the core sample based on a maximum amount of the force used to decouple the core sample from the CS-LCM.

10. The method of claim 9, wherein applying the force to the core sample includes causing the core sample to move toward a distal end of the test apparatus.

11. The method of claim 9, further comprising heating the test apparatus to substantially cure the CS-LCM prior to applying the force to the core sample.

12. The method of claim 9, further comprising placing the core sample upon a removable seat to align the core sample within the body of the test apparatus and removing the seat prior to applying force to the core sample.

13. The method of claim 9, wherein the core sample is substantially cylindrical in shape.

14. The method of claim 9, wherein the CS-LCM substantially fills the volume of the chamber between the core sample and the body.

15. The method of claim 9, further comprising placing the test apparatus on a support cell comprising a passageway prior to applying the force to the core sample, the passageway being defined by a thickness of the support cell.

16. The method of claim 15, wherein a diameter of the support cell passageway is larger than the diameter of the core sample.

17. A system comprising an instrument to apply a force to a subterranean core sample from a wellbore and that is positioned within a test apparatus and in contact with a chemical-sealant, lost-circulation material (CS-LCM), to determine a shear bond strength of the CS-LCM to the core sample.

18. The system of claim 17, wherein the instrument is controllable by a computer.

19. The system of claim 17, further comprising a heating unit to substantially cure the CS-LCM in the test apparatus prior to the instrument applying the force to the subterranean core sample.

20. The system of claim 17, wherein the test apparatus comprises:
a body defining walls of a chamber to receive a subterranean core sample from a wellbore, the body being sized to receive a chemical-sealant lost-circulation material (CS-LCM) to an area of the chamber between the core sample and the body; and
a removable insert mateable to the body, the insert defining a base of the chamber.

* * * * *